United States Patent

Hayashi

Patent Number: 5,439,387
Date of Patent: Aug. 8, 1995

[54] CONNECTOR DEVICE

[75] Inventor: Hiroyuki Hayashi, Yokkaichi, Japan

[73] Assignee: Sumitomo Wiring Systems, Ltd., Mie, Japan

[21] Appl. No.: 230,824

[22] Filed: Apr. 21, 1994

[30] Foreign Application Priority Data

Apr. 27, 1993 [JP] Japan .................. 5-125120

[51] Int. Cl.⁶ .............................. H01R 4/50
[52] U.S. Cl. ................... 439/345; 439/357
[58] Field of Search ............ 439/345, 350–357, 439/370; 403/405.1, 409.1, 410; 24/107

[56] References Cited

U.S. PATENT DOCUMENTS

| | | | |
|---|---|---|---|
| 2,937,793 | 5/1960 | Cornelius | 24/107 |
| 4,002,389 | 1/1977 | Mammel | 439/350 X |
| 4,352,535 | 10/1982 | McNamee, Sr. et al. | 439/345 X |
| 4,915,643 | 4/1990 | Samejima et al. | 439/357 |
| 4,979,910 | 12/1990 | Revil et al. | 439/358 X |

FOREIGN PATENT DOCUMENTS 4-334908 11/1992 Japan .

Primary Examiner—Khiem Nguyen
Attorney, Agent, or Firm—Oliff & Berridge

[57] ABSTRACT

As a charger-side connector is pushed into a car body-side connector, push-out slanting surfaces of a spring plate slide respectively along push-out slanting surfaces of a deep hole halfway, and therefore a restoring force tends to push the charger-side connector back. Namely, if the hold is released halfway, the two connectors are moved away from each other, so that the electrical connection is broken. On the other hand, when the connector is pushed until each leading portion of the spring plate passes past a peak defined by a portion of connection between a drawing slanting surface the push-out slanting surface of the deep hole, the charger-side connector is drawn. Namely, although the connector is pushed out halfway, it is drawn when it passes past this halfway point, so that the two connectors are automatically connected together electrically if the hold is released.

8 Claims, 8 Drawing Sheets

CONNECTOR DEVICE

BACKGROUND OF THE INVENTION

This invention relates to a connector, and more particularly to a connector having a mechanism for maintaining a fitted condition.

As a connector of this type, a connector shown in FIG. 14 is known.

In FIG. 14, one connector 1 has external threads 2 formed on an outer peripheral surface of an end portion thereof, and the other connector 3 has at its outer periphery a rotation ring 5 having internal threads 4 threadedly engageable with the external threads 2.

The two connectors 1 and 3 are disposed in opposed relation to each other, and the rotation ring 5 is rotated to threadedly engage the internal threads 4 with the external threads 2, so that the connectors 1 and 3 are moved toward each other, and are electrically connected together. By rotating the rotation ring 5 in the opposite direction, the connectors 1 and 3 are disengaged from each other, thereby breaking the electrical connection.

In the above conventional connector with the rotation guide, the electrical connection and disconnection are achieved by rotating the rotation ring 5; however, the electrically-connected condition can not be easily grasped merely by rotating the rotation ring 5, and therefore there has been encountered a problem that a half-connected condition in which the connection is incomplete can occur.

SUMMARY OF THE INVENTION

The present invention has been made in view of the above problem, and an object of the invention is to provide a connector of the type in which an electrically-connected condition can be clearly grasped so that a half-connected condition may hardly occur.

In order to achieve the above object, a connector according to the invention, a connector device comprises a first connector including a first mating means having a drawing slanting surface receding progressively in an inserting direction, and a second connector to be coupled with said first connector, including a second mating means having a spring member bent to provide a leading portion which is projected toward said drawing slanting surface, and during insertion operation, said leading portion passes past a peak of said drawing slanting surface, and slides down therealong, and at a o proper fitted position, said leading portion are brought into intimate contact with said drawing slanting surface.

Further, a connector according the invention, during the inserting operation, slanted surfaces slanting in the inserting direction cause the spring member to be bent so that the spring member can pass past the peak of the drawing slanting surface, and the slanted surfaces can cause the spring member to be pushed out in an inserted condition before the leading portion of the spring member slides down along the drawing slanting surface.

Furthermore, in the other connector, the spring members are disposed in opposed relation to each other, with abutment surfaces of the leading portions directed outwardly, and those portions extending forwardly from the leading portions in the inserting direction are bent inwardly to form the slanted surfaces, and are connected together at their front end portions to form an interconnecting portion, and in the one connector, the drawing slanting surfaces are disposed in opposed relation to each other so as to allow the insertion of the interconnecting portion.

Still further, that portion of the one connector disposed rearwardly of the peak of the drawing slanting surface in the inserting direction is receding progressively in a direction opposite to the inserting direction to form the slanted surface as in the drawing slanting surface.

In the invention of the above construction, when the pair of connectors are fitted together, the spring member is held in intimate contact with the drawing slanting surface in the proper fitted position. During the inserting operation, the front end portion of the leading portion must be bent so that it can pass past the peak of the drawing slanting surface, and when the front end portion of the leading portion passes past the peak of the drawing slanting portion, this front end portion begins to move down along this slanting portion. This downward movement force draws the other connector into the proper fitted position.

Further, during the inserting operation, the spring member is bent by the slanted surface, slanting in the inserting direction, so that the spring member can pass past the peak of the drawing slanting surface. The spring member is thus bent along the slanted surface, and therefore a reaction force acts to push out the spring member. This reaction force acts in an inserted condition before the leading portion of the spring member moves down along the drawing slanting surface, and therefore this reaction force acts to push out the spring member before the spring member moves down, and then acts to draw the spring member after the spring member moves down.

Furthermore, the spring members are disposed in opposed relation to each other, with the abutment surfaces directed outwardly. Therefore, the front end portions of the leading portions are spread outwardly, and those portions extending forwardly from the leading portions in the inserting direction are bent inwardly in the inserting direction, and are connected together at their front end portions to form the interconnecting portion, so that the front end portion is generally in the shape of a diamond as in a trump card. Therefore, during the inserting operation, when the diamond-shaped front end portion is bent inwardly so as to pass past the peaks of the drawing slanting surface, this front end portion is generally squeezed as a whole. In this squeezed condition, the spring member is compressed from the opposite sides, and therefore produces an increased restoring force, and an increased reaction force tends to push out the spring member. Then, when the most bulged portion passes past the peaks of the drawing slanting surfaces, it expands along the drawing slanting surfaces to draw the spring member inwardly. At this time, the spring member is inwardly drawn into the proper fitted position since the insertable interconnecting portion is formed forwardly of the drawing slanting surfaces.

Still further, that portion disposed rearwardly of the peak of the drawing slanting surface in the inserting direction is receding progressively in a direction opposite to the inserting direction, thus forming a convex portion. The front end portion of the leading portion of the spring member is abutted against the slanted surface disposed rearwardly in the inserting direction, and is bent, and until this front end portion passes past the peak of the drawing slanting surface, this front end portion tends to move down along this slanted surface so that the spring member can be pushed out.

As described above, in the present invention, when the spring member is inserted until it passes past the peaks of the drawing slanting surfaces, the restoring force of the spring member is converted into a drawing force, so that the connector is drawn into the proper fitted position. Thus, there is provided the connector in which it is judged that the electrical connection is positively made by confirming this drawing operation.

Further, before the drawing operation occurs, the force acts in the push-out direction, and therefore in a half-inserted condition, the connector is pushed out, thus clearing indicating the fitted condition.

Furthermore, the spring member is compressed from the opposite sides to be squeezed, and therefore the increased restoring force is obtained, thereby clearly indicating the drawing operation and the push-out operation.

Still further, the two slanting surfaces of the convex portion serve as the drawing surface and the push-out surface, respectively, and therefore the peak can be formed at a desired position.

DETAILED DESCRIPTION OF PREFERRED EMBODIMENTS

One preferred embodiment of the present invention will now be described with reference to the drawings. In this embodiment, the invention is applied to a connector for charging an electric car, and one connector is fixed to a body of the car while the other connector is connected to a distal end of a charging cable connected to a charger.

Figure 1:
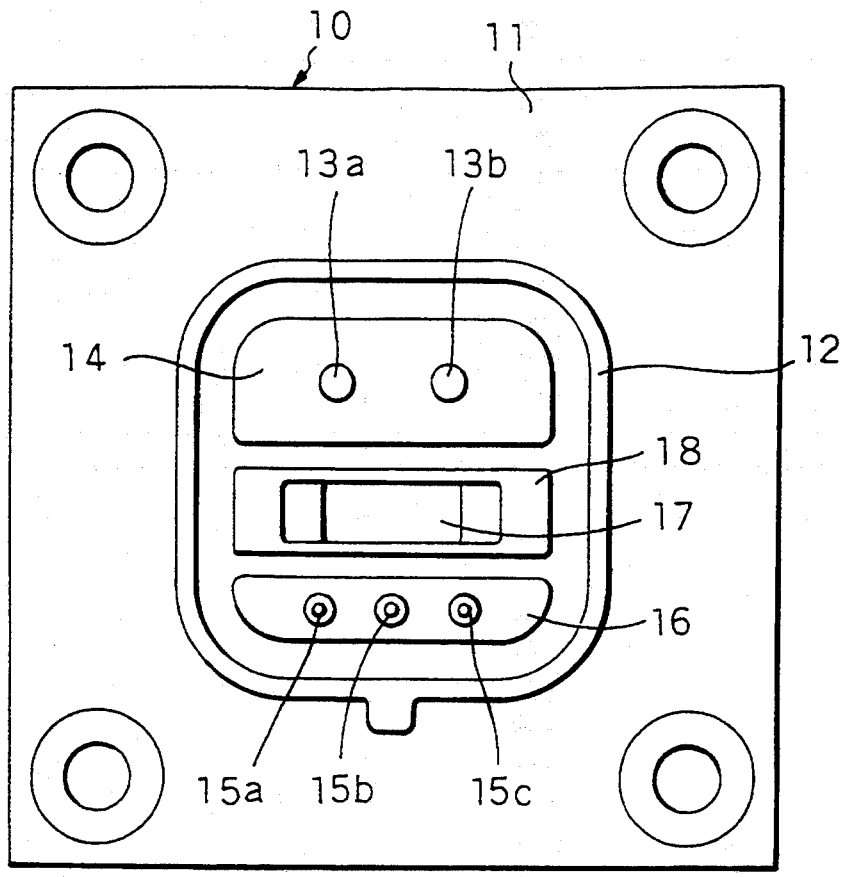
FIG. 1 is a front-elevational view of a car body-side connector in a preferred embodiment of a connector of the present invention.
Figure 2:
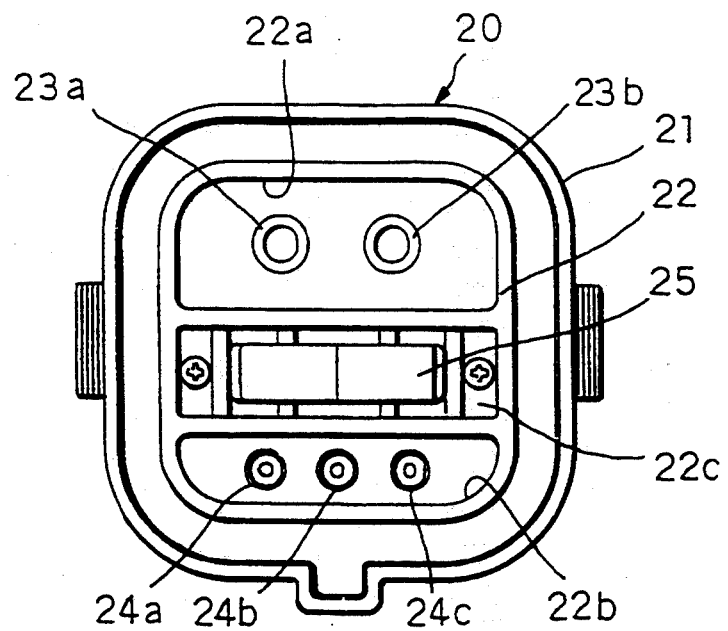
FIG. 2 is a front-elevational view of a charger-side connector.

FIG. 1 is a front-elevational view of the car body-side connector in one preferred embodiment of a connector of the present invention, and FIG. 2 is a front-elevational view of the charger-side connector.

Figure 3:
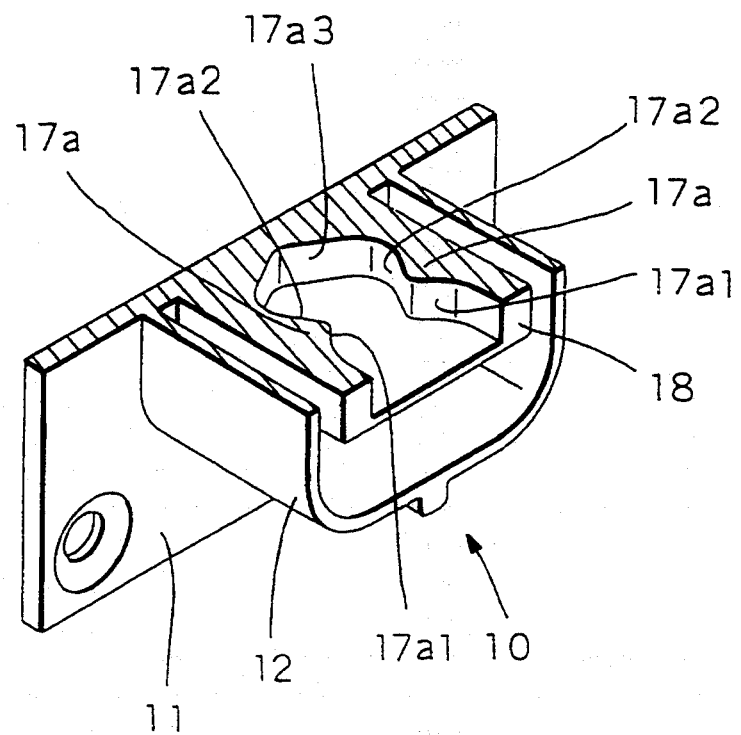
FIG. 3 is broken, perspective view of the car body-side connector.
Figure 4:
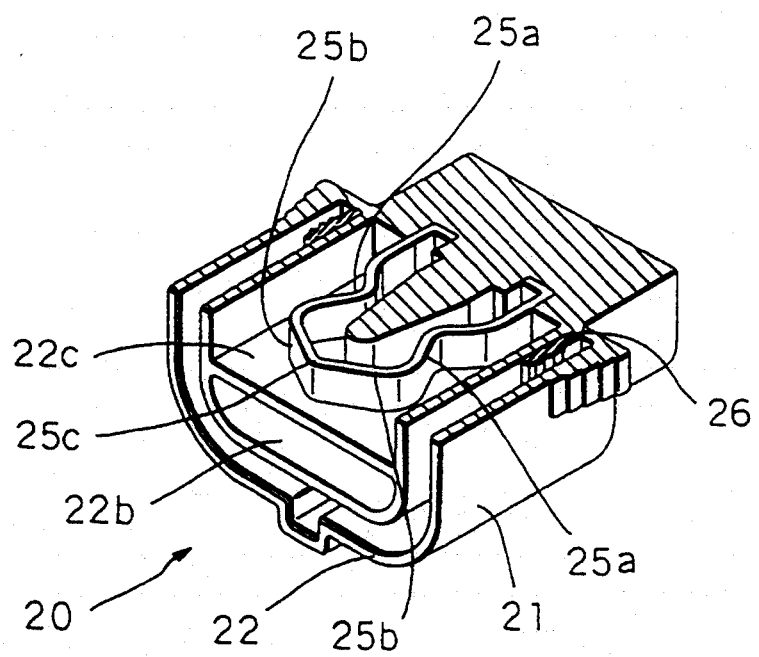
FIG. 4 is a broken, perspective view of the charger-side connector.

In the drawings, the car body-side connector 10 includes a square mounting plate 11 having bolt insertion holes formed respectively through four corners thereof, and a tubular hood portion 12 formed on and projected from a front face of this mounting plate. A first terminal support base 14 supporting power terminals 13 in a projected manner, as well as a second terminal support base 16 supporting signal terminals 15a to 15c in a projected manner, is formed within the hood portion 12, and is directed toward an open end of the hood portion. An engagement hole member 18, having a deep hole 17 of a generally gourd-shape, is provided between the first terminal support base 14 and the second terminal support base 16, and is directed toward the open end of the hood portion, as shown in FIG. 3. Convex portions 17a are formed respectively on opposite sides of the deep hole 17, and are disposed generally in the middle of the depth of this deep hole. With respect to each convex portion 17a, a slanting surface adjacent to the open end is called a push-out slanting surface 17a1, and a slanting surface at an inner side is called a drawing slanting surface 17a2, and an innermost portion is called an interconnection portion-receiving portion 17a3.

On the other hand, the charger-side connector 20 includes a hood portion 21 projecting for fitting on the outer periphery of the hood portion 12, and a receptive tubular portion 22 provided internally of the hood portion 21. The receptive tubular portion 22 is partitioned into small chambers into which the first terminal support base 14, the engagement hole member 18 and the second terminal support base 16 can be inserted, respectively. The receptive tubular portion 22 is thus partitioned into three small chambers, that is, a first reception hole 22a for receiving the first terminal support base 14, a second reception hole 22b for receiving the second terminal support base 16 and a third reception hole 22c for receiving the engagement hole member 18. Tubular power terminals 23a and 23b into which the power terminals 13a and 13b can be inserted, respectively, for connection thereto are supported on an inner end of the first reception hole 22a, and tubular signal terminals 24a to 24c into which the signal terminals 15a to 15c can be inserted, respectively, for connection thereto are supported on an inner end of the second reception hole 22b.

Figure 10:
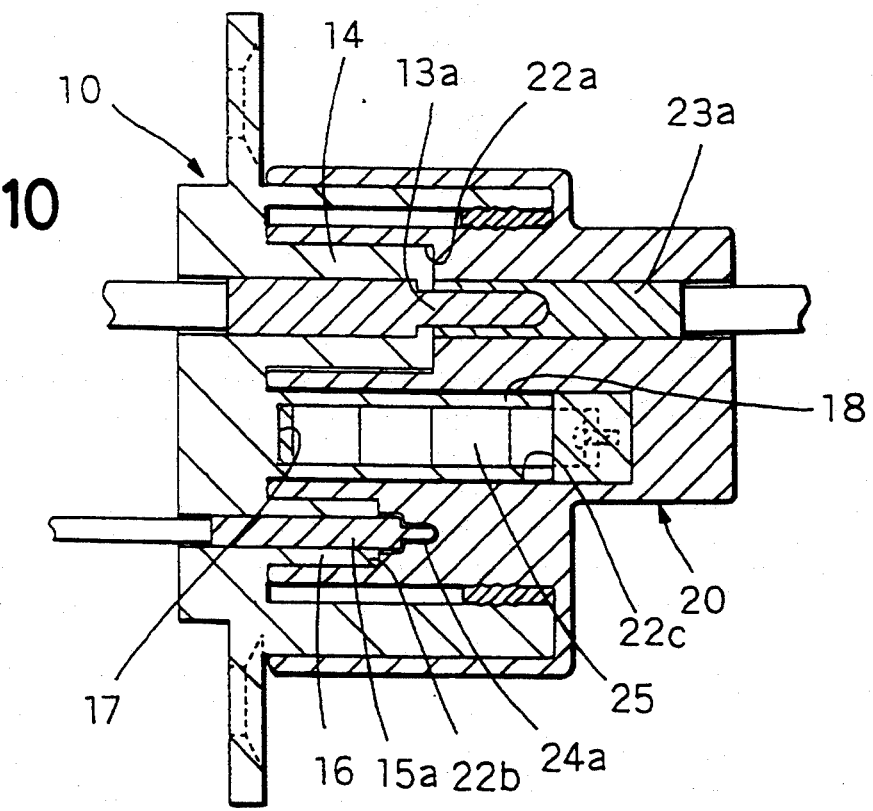
FIG. 10 is a vertical cross-sectional view of the connector in the fitted condition.

When the car body-side connector 10 and the charger-side connector 20 are fitted together in a proper fitted position as shown in FIG. 10, the first terminal support base 14 is fully inserted deep into the first reception hole 22a, so that the power terminals 13a and 13b are connected respectively to the power terminals 23a and 23b, and also the second terminal support base 16 is fully inserted deep into the second reception hole 22b, so that the signal terminals 15a to 15c are connected respectively to the signal terminals 24a to 24c.

A spring plate 25, having an outer shape corresponding to the shape of the deep hole 17, is retained in the third reception hole 22c. The spring plate 25 has a constricted portion intermediate opposite ends thereof. Slanting portions each bulging from the constricted portion toward the front end are called a leading portion 25a, slanting portions progressively approaching each other from the leading portions 25a toward the front end are called a push-out slanting surface, and a front end portion extending from the push-out slanting surfaces 25b to the front end are called an interconnecting portion 25c.

A waterproof seal ring 26 is mounted on the outer peripheral surface of the receptive tubular portion 22 of the charger-side connector 20 at its innermost portion, and can be held in contact with the inner peripheral surface of the hood portion 12 of the car body-side connector 10 so as to prevent the intrusion of water.

The operation of this embodiment of the above construction will now be described.

Figure 5:
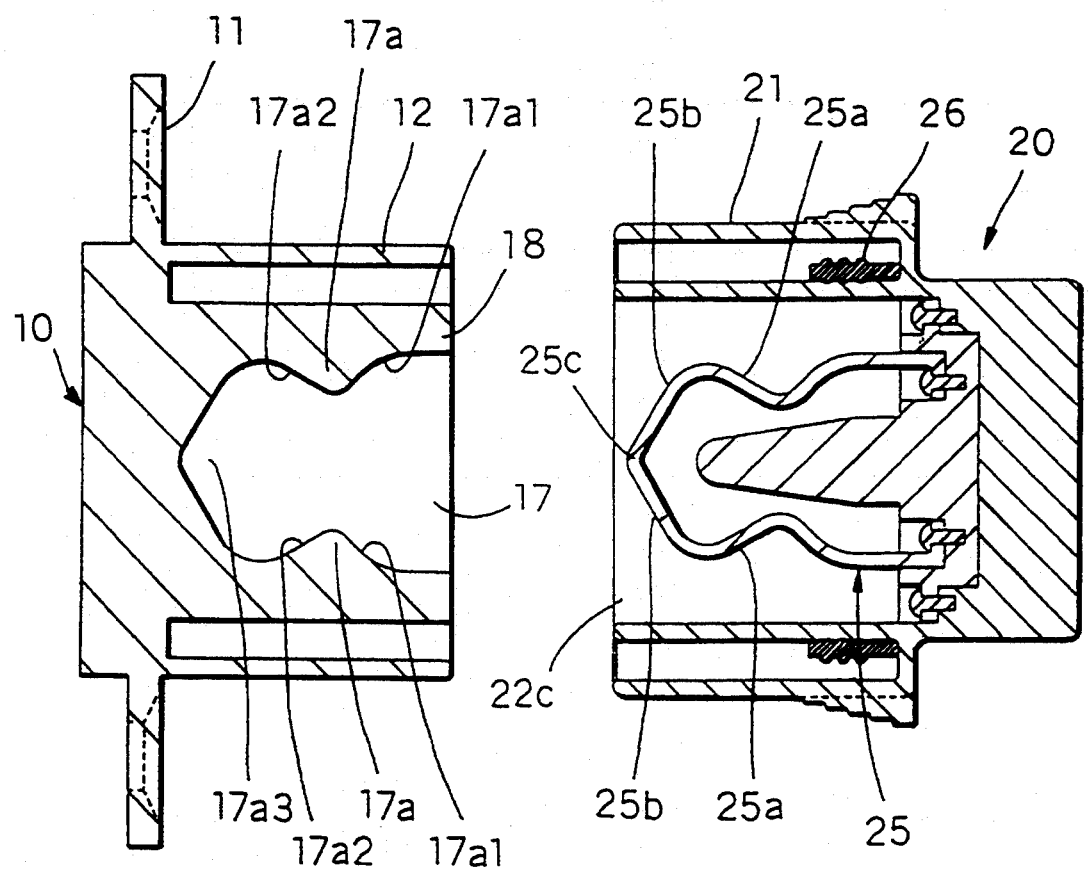
FIG. 5 is a horizontal cross-sectional view of the connector before the fitting is effected.
Figure 6:
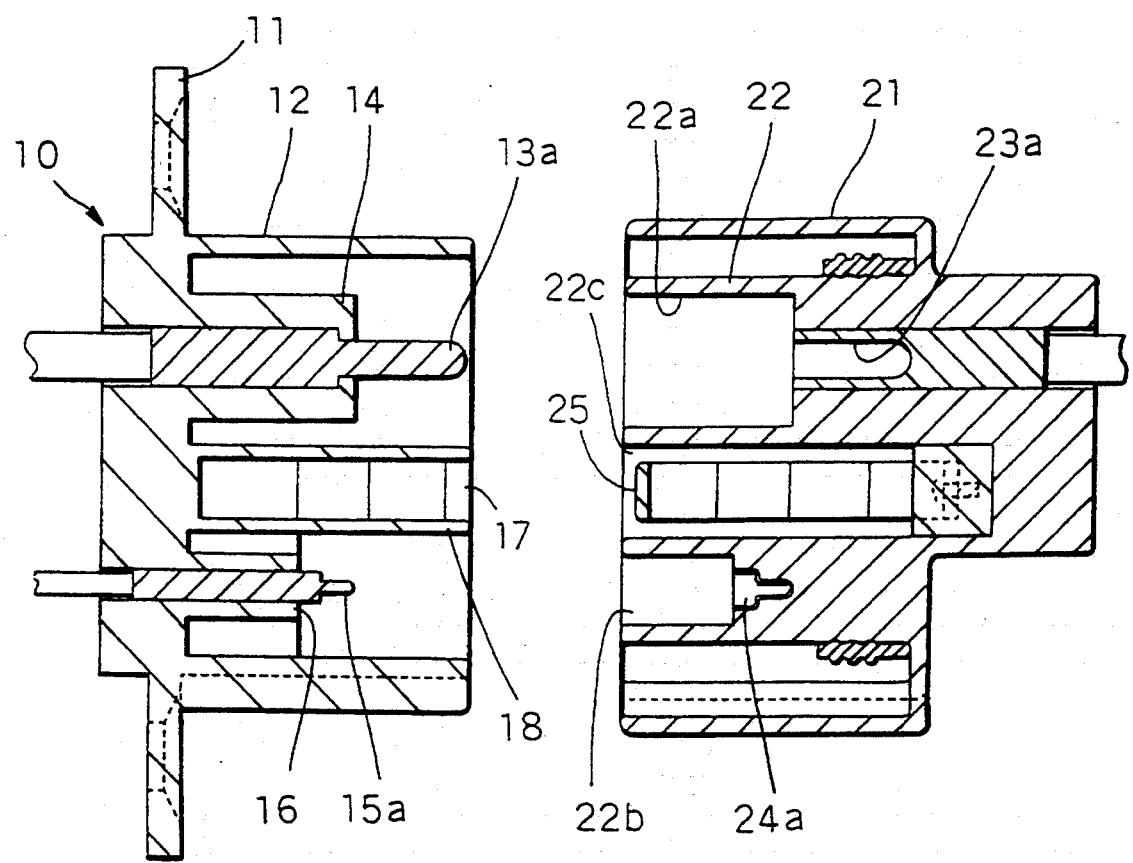
FIG. 6 is a vertical cross-sectional view of the connector before the fitting is effected.

The car body-side connector 10 and the charger-side connector 20 are disposed in opposed relation to each other as shown in FIGS. 5 and 6, and the hood portion 12 of the car body-side connector 10 is inserted into a space between the hood portion 21 and the receptive tubular portion 22 of the charger-side connector 20. In accordance with this inserting operation, the spring plate 25 of the charger-side connector 20 is inserted into the deep hole 17 in the engagement hole member 18 of the car body-side connector 10.

Figure 7:
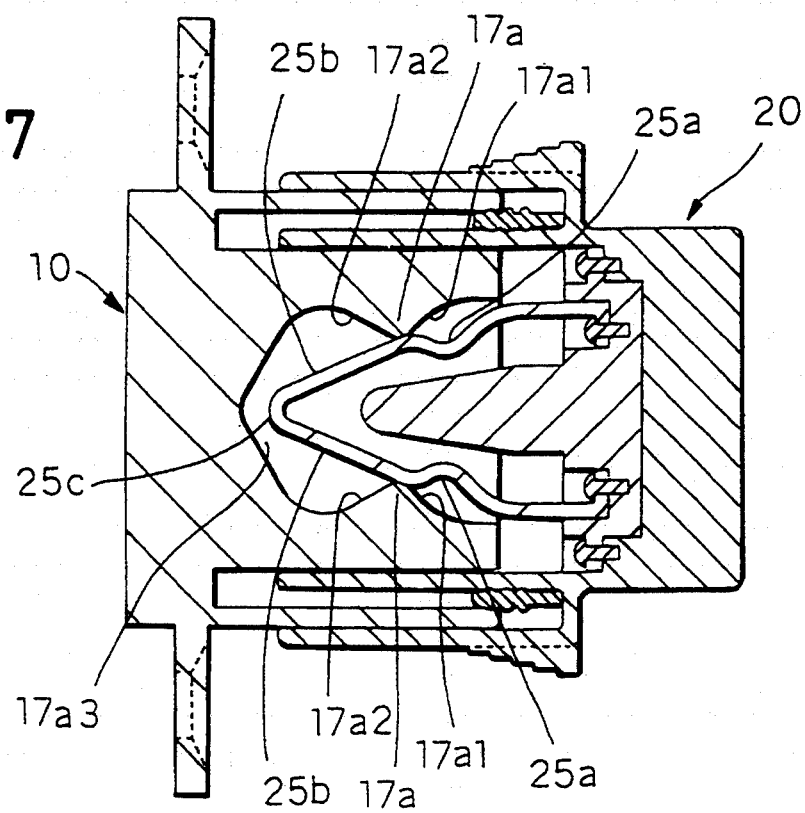
FIG. 7 is a horizontal cross-sectional view of the connector during the fitting operation.
Figure 8:
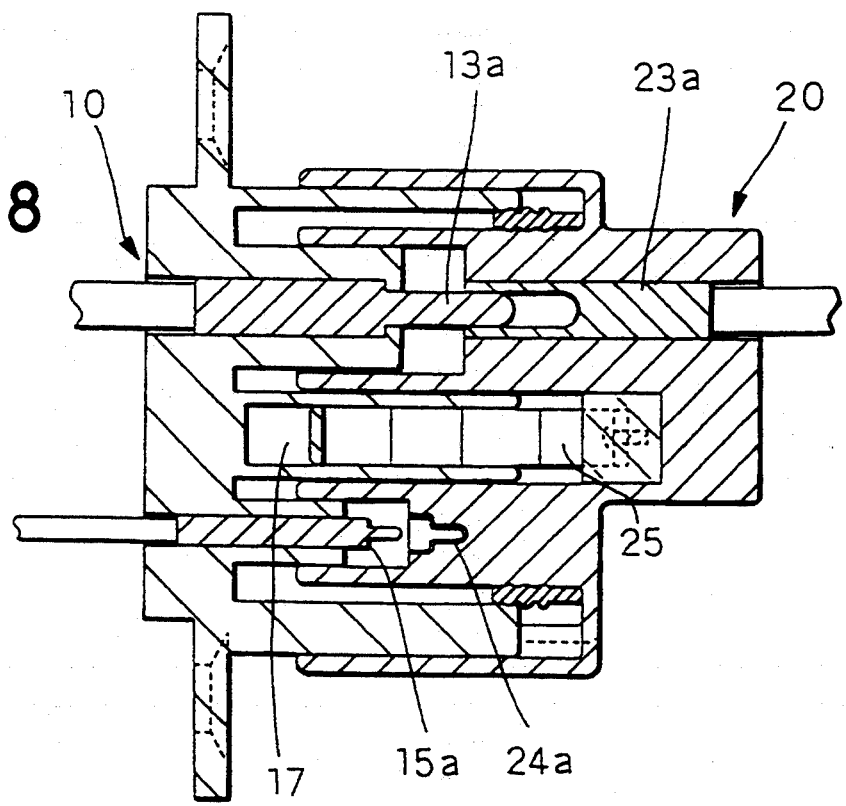
FIG. 8 is a vertical cross-sectional view of the connector during the fitting operation.

As the spring plate 25 is thus inserted, the push-out slanting surfaces 25b of the spring plate 25 are abutted respectively against the push-out slanting surfaces 17a1 of the convex portions 17a formed generally in the middle of the depth of the deep hole 17. The spring plate 25, when further inserted, is flexed and reduced in width, as shown in FIGS. 7 and 8. Here, the spring plate 25 is reduced in width from the opposite sides, and tends to be restored with a larger force than in the case where it is flexed when passing past one convex portion 17a.

If the inserting operation is stopped in this condition, the push-out slanting surfaces 25b of the spring plate 25 slide down the push-out slanting surfaces 17a1 of the convex portions 17a, respectively, and therefore the spring plate is pushed out in a direction opposite to the inserting direction.

Figure 9:
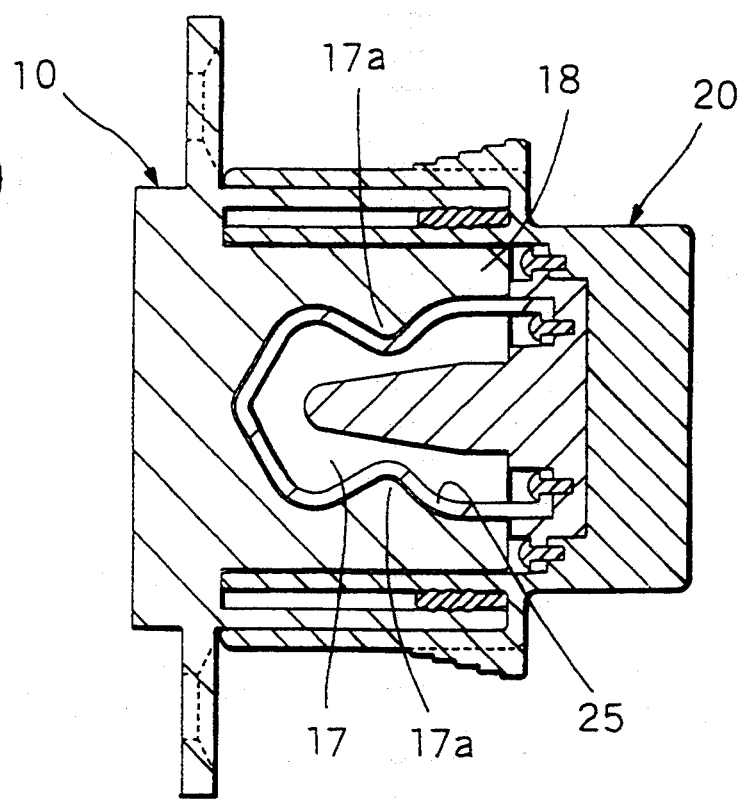
FIG. 9 is a horizontal cross-sectional view of the connector in a fitted condition.

However, during this inserting operation, when the portion of connection between each push-out slanting surface 25b and the leading portion 25a passes past the peak of the convex portion 17a, the spring plate 25 is restored to produce an expanding force which causes the slanting leading portions 25a to slide down along the drawing slanting surfaces 17a2 of the convex portions 17a, respectively. As a result, the spring plate 25 is drawn into the deep hole 17, so that the spring plate 25 is fully restored into its original shape, and is brought into intimate contact with the inner peripheral surface of the deep hole 17, as shown in FIG. 9.

In this condition, the engagement hole member 18 is fully received deep in the third reception hole 22c, as shown in FIG. 10, and also the first terminal support base 14 and the second terminal support base 16 are fully received deep in the first and second reception holes 22a and 22b, respectively. Therefore, the power terminals 13a and 13b projecting from the first terminal support base 14 are inserted respectively into the power terminals 23a and 23b retained in the inner end portion of the first reception hole 22a, thereby achieving electrical connection, and also the signal terminals 15a to 15c projecting from the second terminal support base 16 are inserted respectively into the signal terminals 24a to 24c retained in the inner end portion of the second reception hole 22b, thereby achieving electrical connection.

Thus, as the charger-side connector 20 is pushed into the car body-side connector 10, the push-out slanting surfaces 25b of the spring plate 25 slide respectively over the push-out slanting surfaces 17a1 of the deep hole 17 halfway, and therefore the restoring force tends to urge the charger-side connector 20 back. Namely, if the hold is released halfway, the two connectors are moved away from each other, so that the electrical connection is not achieved.

However, when the connector is pushed until each leading portion 25a of the spring plate 25 passes over the peak defined by the portion of connection between the drawing slanting surface 17a2 and the push-out slanting surface 17a1 of the deep hole 17, the charger-side connector 20 is drawn. Namely, the connector is pushed out halfway, but after it passes past this halfway point, the connector is drawn when the hold is released, so that the two connectors are automatically fitted together to be electrically connected together completely.

Figure 11:
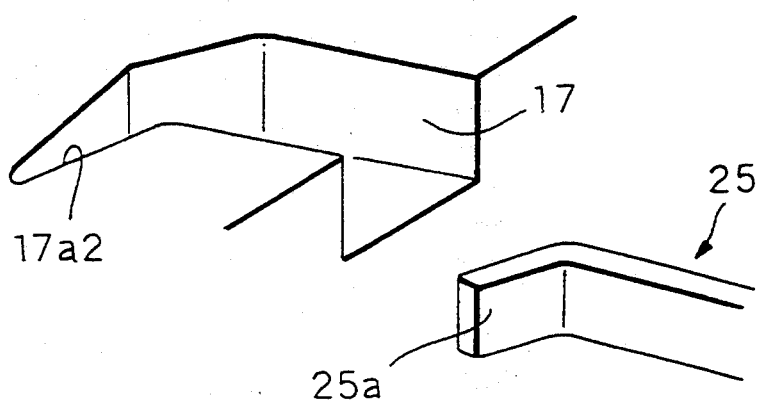
FIG. 11 is a perspective view showing a deep hole and a spring member in another embodiment.
Figure 12:
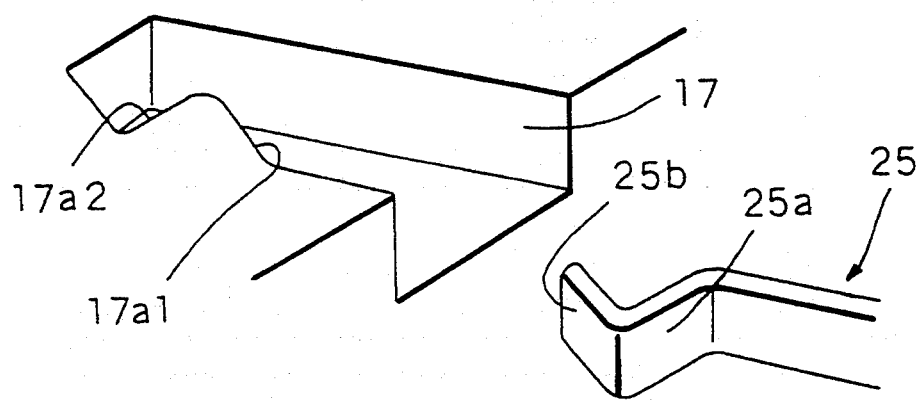
FIG. 12 is a perspective view showing a deep hole and a spring member in a further embodiment.
Figure 13:
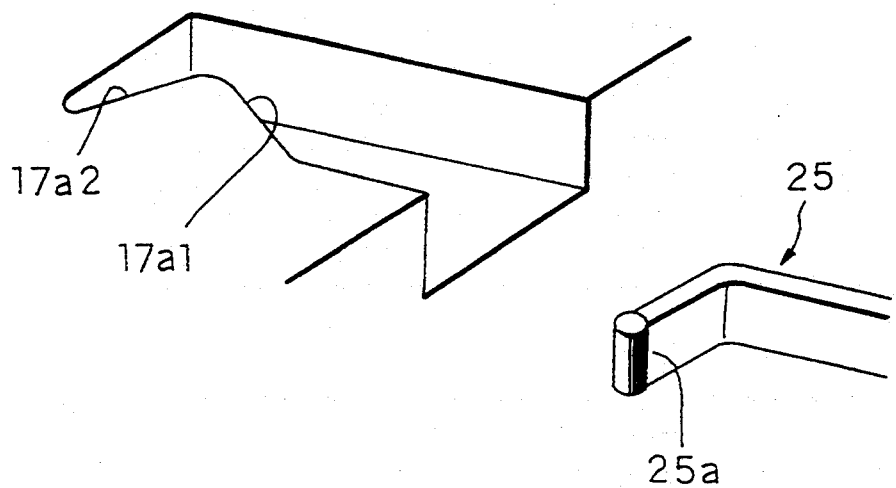
FIG. 13 is a perspective view showing a deep hole and a spring member in a still further embodiment.
Figure 14:
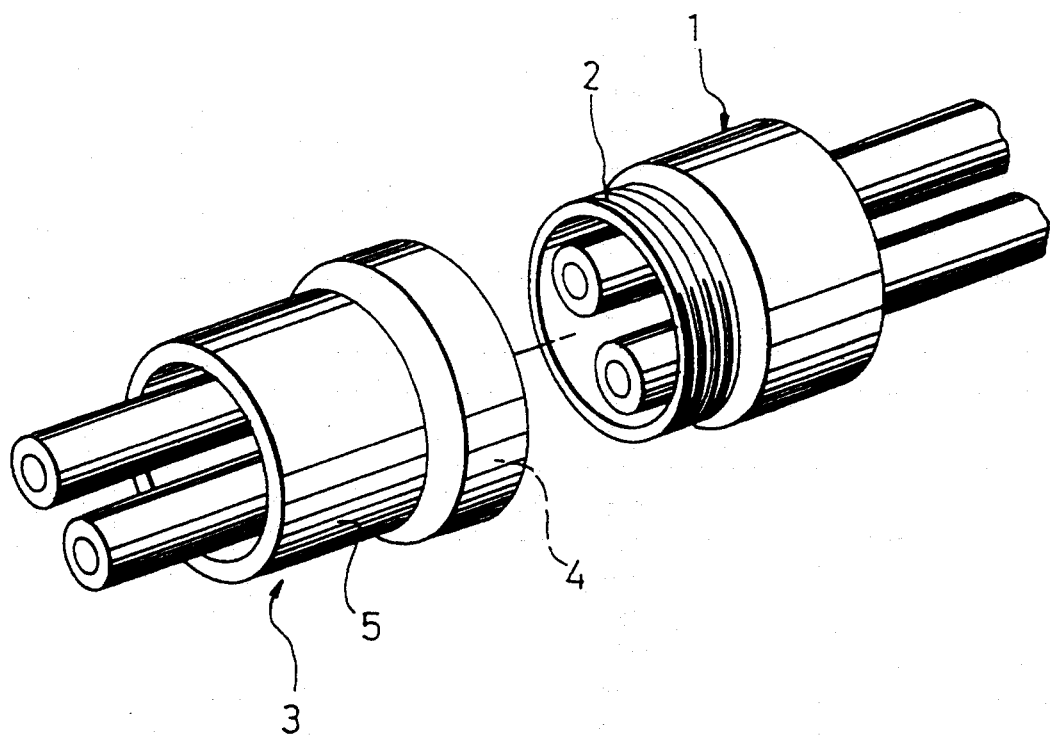
FIG. 14 is a perspective view of a conventional connector.

FIGS. 11 to 13 show modified examples of deep hole 17 and spring plate 25. The spring plate 25 does not always need to have a loop-like shape, and may comprise a generally elongate plate extending in the inserting direction, as shown in each of these Figures.

In the example shown in FIG. 11, a spring plate 25 is curved, and is inserted into a deep hole 17. When a front end of a leading portion 25a of the spring plate 25 passes past a peak of a drawing slanting surface 17a2, this front end slides down along the drawing slanting surface 17a2 to draw a charger-side connector 20. In this example, the connector can not be pushed out in a half-connected condition.

In the example shown in FIG. 12, as is the case with the loop-shaped spring plate 25, a push-out slanting surface 25b at a front portion of a spring plate 25 serves to push out a charger-side connector 20 until the push-out slanting surface 25b passes past a push-out slanting surface 17a1 of a deep hole 17. After the push-out slanting surface 25b passes past the push-out slanting surface 17a1, a leading portion 25a slides down along a drawing slanting surface 17a2 to draw the charger-side connector 20.

In the example shown in FIG. 13, a roller-like portion is formed at a front end of a leading portion 25a of a spring plate 25 so that the spring plate can more easily slide up along a push-out slanting surface 17a1 of a deep hole 17.

What is claimed is:

1. An electrical connector device comprising:
a first connector including a first mating means having at least one drawing slanting surface receding progressively in an inserting direction; and
a second connector to be electrically coupled with said first connector, including a second mating means having a spring member bent to provide at least one leading portion which is projected toward said drawing slanting surface;
wherein said leading portion passes past a peak of said drawing slanting surface and slides down therealong, so that the second mating means is drawn into said first mating means during insertion operation, and said leading portion is brought into intimate contact with said drawing slanting surface at a proper fitted position.

2. An electrical connector device according to claim 1, wherein said first mating means includes a push-out slanting surface, and said push-out surface causes said spring member to be pushed out against the inserting direction before said leading portion passes a peak of said drawing slanting surface during the inserting operation.

3. An electrical connector device according to claim 2, wherein said spring member includes at least two leading portions that are disposed in opposed relation to each other, with abutment surfaces of said leading portions directed outwardly, and those portions extending forwardly from said leading portions in the inserting direction are bent inwardly to form slanted surfaces, and are connected together at their front end portions to form an interconnecting portion, and said first mating means includes at least two drawing slanting surfaces that are disposed in opposed relation to each other so as to allow the insertion of said interconnecting portion.

4. An electrical connector device according to claim 2, wherein a portion of said first connector disposed rearwardly of the peak of said drawing slanting surface in the inserting direction is receding progressively in a direction opposite to the inserting direction to form said push-out slanting surface as in said drawing slanting surface.

5. An electrical connector device according to claim 3, wherein a portion of said first connector disposed rearwardly of the peak of said drawing slanting surface in the inserting direction is receding progressively in a direction opposite to the inserting direction to form said push-out slanting surface as in said drawing slanting surface.

6. An electrical connector device according to claim 1, wherein said first and second connectors include power terminals for supplying electrical power.

7. An electrical connector device according to claim 1, wherein said first and second connectors include signal terminals for transmitting control signals.

8. A connector device comprising:
   a first connector including:
      a tubular hood portion;
      terminal support base for supporting electrode terminals, formed in said tubular hood portion and directed toward an open end of said tubular hood portion; and
      an engagement hole member having a deep hole in which a drawing slanting surface is formed;
   a second connector including:
      a second hood portion projecting for fitting on the outer periphery of said tubular hood portion;
      a receptive tubular portion provided internally of said second tubular portion, which is partitioned into small chambers into which said terminal support base and said engagement hole member are inserted;
      tubular terminals into which said electrode terminals are inserted, respectively; and
      a spring plate having an outer shape corresponding to the shape of the deep hole, and having a leading portion which toward said drawing slanting surface;
   wherein said leading portion passes a peak of said drawing slanting surface and slides down therealong, so that the second connector is drawn into said engagement hole member, and said spring plate is brought into intimate contact with said drawing slanting surface at a proper fitted position.

* * * * *